United States Patent
Gravina

[11] 3,756,463
[45] Sept. 4, 1973

[54] DISPENSING CONTROL AND/OR MONITORING APPARATUS

[75] Inventor: Timothy J. Gravina, London, England

[73] Assignees: Westinghouse Brake and Signal Company, Limited, London, England

[22] Filed: Feb. 4, 1971

[21] Appl. No.: 111,603

[30] Foreign Application Priority Data
Feb. 4, 1970 Great Britain..................... 5,342/70

[52] U.S. Cl. ................................................ 222/26
[51] Int. Cl............................................. B67d 5/56
[58] Field of Search .................. 222/23, 25, 26, 27, 222/28, 2, 30; 194/5, 13

[56] References Cited
UNITED STATES PATENTS

| | | | |
|---|---|---|---|
| 3,130,869 | 4/1964 | Phillips .................................. | 222/26 |
| 3,429,480 | 2/1969 | Petyt...................................... | 222/26 |
| 3,603,481 | 9/1971 | Dilger................................... | 222/23 |
| 3,042,258 | 7/1962 | Mayes................................... | 222/26 |

Primary Examiner—Robert B. Reeves
Assistant Examiner—Thomas E. Kocovsky
Attorney—Larson, Taylor & Hinds

[57] ABSTRACT

Product dispensing and blending control apparatus especially for automobile self-service filling station forecourts includes at each delivery pump unit high and low octane volume pulse generators the outputs of which are applied over fire proof cables to an electronic remote volume pulse proportioning system and a count up and a count down counter the output of which controls the delivered blend to a set value.

Another feature either independently or in combination with the blend control is the pricing control which again is operated by pulse proportioning means dependent upon decode counter outputs and a ratio code.

The proposal is especially advantageous in that it enables all but the minimum of apparatus to be located away from the delivery pump units and is therefore amenable to modular electronic construction using the most up to date integrated circuits.

16 Claims, 8 Drawing Figures

DISPENSING CONTROL AND/OR MONITORING APPARATUS

This invention relates to dispensing control and/or monitoring apparatus and relates especially but not exclusively to dispensing control and for monitoring apparatus which is intended for use in the forecourts of petrol filling stations.

It has been proposed previously to provide petrol pump on petrol filling station forecourts which are capable of dispensing a selected one of a number of grades of fuel. This is achieved by providing supplies of high octane fuel and low octane fuel and incorporating a blending valve in the pumping mechanism which is set to enable the pump to deliver the desired proportions of the two fuels to customers' tanks.

According to the present invention there is provided dispensing control apparatus for control of means for dispensing a blend of desired proportions of material from two sources and having signal producing means for producing trains of repeating signals corresponding to set quantities of material dispensed and accruing means responsive to said signals for accruing a representation of overall departure from the desired proportions and in response thereto adjusting the dispensing means the adjustment tending to compensate for such departure.

The signal producing means may include means responsive to the flow material from one source for producing a first train of pulses the number of which is proportional to the quantity of material from one source and a further train of pulses the number of which is proportional to a set proportion of the total of material from both sources and the accruing means being incrementally responsive to one said train and decrementally responsive to the other, the adjustment tending to maintain a predetermined condition of the accruing means.

The apparatus may further include means responsive to the flow of material from the other said source for producing a second train of pulses the number of which is proportional to the quantity of material from the other source, means for producing a total pulse train corresponding to the sum of the first and further trains and applying the total pulse train to proportioning means for producing the said further train of pulses.

The apparatus may include electronic counter means and a logical volume pulse proportioner circuit operable to receive binary outputs from the counter and a coded input representing a blend percentage to transmit a number of pulses per cycle of the counter depending upon the binary coded input.

The apparatus may further include further electronic counter means responsive to impulses and a further logical volume pulse proportioner circuit operable to receive binary outputs from the latter counter and a binary coded input representing a blend price setting to transmit a number of pulses per cycle of the latter counter depending upon the blend price setting these pulses being applied to means for totalising the price for the volume of the blend delivered.

The apparatus for dispensing such blends may comprise one of a plurality of delivery units these being each provided with individual such counters and logical volume pulse proportioner circuits.

Scanning means may be provided operable to continuously scan a central plurality of blend numbers with associated manually settable blend and price storage devices one for each selectable blend and being operable to commit to storage means pertaining to a said pump the settings of the storage device which pertain to a selected blend number to make available to the said logic circuit thereof the requisite binary coded inputs.

Additionally, scanning means may be provided for scanning the outputs of circuit modules for each such pump in turn and on arrival at a circuit module pertaining to a pump via which a dispensing operation is complete, transferring the state of counters therein to a printer to print a record of the quality and/or price of the material delivered.

Whilst in a comprehensive form the invention provides for control of blending of two products and for price computation based upon set in values of blend and price per unit quantity the invention may afford one or other of these features.

Accordingly the invention further provides dispensing control apparatus for monitoring dispensing means for dispensing a desired quantity of material from a source and having signal producing means for producing a train of repeating pulses the number of which during a given dispensing operation is proportional to the quantity of material delivered, a material quantity coded counter responsive thereto to produce a binary coded quantity output and a material price code store, price proportion logic circuit means connected to receive the blend price code and said binary coded quantity output to produce pulses in a price pulse train corresponding to a proportion of the pulses in the quantity pulse train.

Other features and attributes of this latter aspect of the invention will be appreciated from the accompanying detailed description of the comprehensive system and the appended claims.

Where the apparatus is employed for an automated filling station forecourt, the electronic counters, logic circuit and storage devices and means may be disposed at an operations location remote from the forecourt delivery units these being equipped with the metering means, pulse generators for producing the impulses and blending valve means operable in response to a control signal from the operators location. Additionally, but not necessarily, the delivery units may be provided with means whereby the customers can themselves set the blend of fuel required to be dispensed.

In order that the invention may be more clearly understood and readily carried into effect, the same will be further described by way of example with reference to the accompanying drawings of which:

FIGS. 3a and 3b and 3c illustrate a logic circuit and truth tables respectively to be referred to, and FIGS. 4a, 4b, and 4c when placed side by side represent a pump module for a self service filling station equipment employing the invention, being an elaboration of part of the outlining system of FIG. 2.

Before reference is made to the drawing and the operation of the system, some general discussion of the system may be given. The system is intended to be incorporated in a forecourt of a petrol filling station and the forecourt is to be provided with one or more delivery units, more usually referred to as pumps which are capable of supplying petrol blends of desired grades in accordance with manual operation of one of a number of blend selections buttons by a customer. It will be appreciated that whilst the delivery units often contain pumps, it is by no means necessary that this should be so. Products may be fed if desired to them under pressure. On arrival at the "pump", the customer depresses the button which corresponds to the desired blend grade of fuel which is suitable to his vehicle and on depression of the button a lamp is normally illuminated to confirm to the customer the blend which has been selected. The depression of the blend selection button causes the transmission of information to a central desk at which an operator sits and the blend selection causes a flashing red illumination on a control panel corresponding to the pump in question. On observing the flashing red indication the operator presses a pump start button which causes an appropriate signal to be transmitted back to the pump to cancel any previous cash and quantity display thereon and initiate operation of the pump motors. The customer is then able to deliver such quantity of fuel as he may desire into the tank of his vehicle. On completion of the operation, the delivery nozzle is replaced by the customer and the indication which reverted to a continuous red signal on depression of the start button is extinguished in favour of a flashing green indication to indicate to the operator that the delivery operation has been completed. The customer then proceeds to the control desk to pay the operator. Replacement of the nozzle also causes the printer at the control desk to print out a ticket bearing date, pump number, quantity delivered, blend number and cash to be charged. The print out operation has the effect of cancelling the selection display at the pump but leaving the customers cash and quantity indications. The pump is then in condition for use by a subsequent customer such use being effective to cancel the previous indications.

The dispensing apparatus, namely the delivery pump unit itself, operates by virtue of there being incorporated therein a blending valve which is set to a position to enable the relative flows of fuel as drawn by an electric pump from two tanks, one for high octane fuel and one for low octane fuel. The supply lines from the respective tanks include metering devices by which the actual quantities of fuel from the two tanks are metered and the outputs of these metering devices are employed to ensure that the desired blend is maintained by the blending valve.

In the present system, electric motor driven pumps, blending valve and metering devices are included within the case of the delivery pump unit on the forecourt and above it there is disposed a control panel for use by the customer the panel being linked to an installation in the operator's office. This office installation includes apparatus for effecting remote control of the blending valves of the one or more pumps and performing the necessary computations for producing the information to be printed out at the end of each sale by any one pump.

Figure 1:
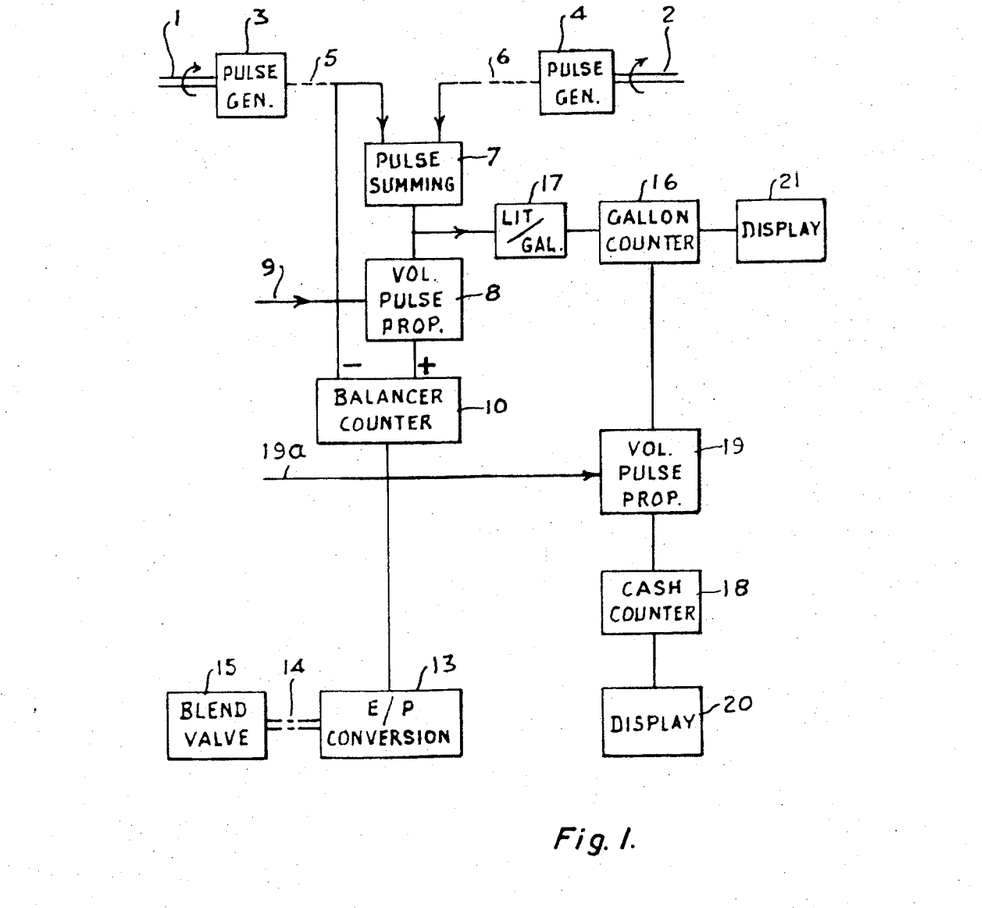
FIG. 1 illustrates in diagrammatical form part of a dispensing apparatus for use in a petrol filling station forecourt.

Referring to the drawing, there are shown two shafts represented by references 1 and 2 these shafts being connected to metering devices which are not shown but which are included in the supply pipes from the two storage tanks. These shafts pertain to one pump only and are connected to respective pulse generators represented by blocks 3 and 4 and these pulse generators are suitable devices which produce 100 electrical impulses for each gallon which flows through the respective metering device. The pulse train outputs from the pulse generators 3 and 4 are transmitted over line wires shown dotted at 5 and 6 to a pulse summing device represented by block 7 situated at the operator's location remote from the actual delivery pump. The output of 7 which represents the total volume of fuel dispensed during a given operation is applied to a volume pulse proportioner represented by block 8 and which receives a control signal via the line 9 dependent upon the blend setting which is initiated by a customer. Block 8 is such as to produce a percentage rate of pulsing, that is it provides X pulses for every 100 pulses fed into it. The output of 8 is then applied to a balancer counter represented by the block 10 as a plussage input and pulses appearing on the line 5 are also applied to the balance counter 10 as a minussage input. The counter 10 is therefore a digital counter which counts up for one input and down for the other input. The object of the counter 10 is that it should remain at an overall count of substantially zero throughout the sale operation. Any departure of the output at the counter 10 from zero is applied over an electrical link represented by the line 12 to an electric-to-pneumatic conversion unit 13 an air pressure link 14 to the pump alters via an air operated actuator the adjustment of the blend valve which is represented by the block 15 in the pump unit.

The blend valve 15 is a valve which is identical to valves previously employed in blending delivery pump units and details thereof have no place in this discussion.

For the purposes of the price accounting aspect of the equipment, there is provided a gallon counter unit represented by block 16 connected via an optional gallons-to-litres converter unit 17 to the output of the pulse summing unit 7. The gallon counter 16 operates a digital quantity display unit 21 and also produces outputs to a volume pulse proportioner represented by block 19 similar to the proportioner 8 and which operates in accordance with a gallon-price setting to produce an output to a cash counter 18 which is capable of providing both a visual indication on a digital cash display unit represented by block 20 and providing outputs to a printer not shown for printing out customers tickets and recording sales on a print roll.

Considering now in greater detail the operation of the arrangement shown in the drawing, the blend ratio setting which is set in via the input 9 to the volume pulse proportioner 8 is, as will be appreciated from the foregoing derived over a control line from the blend selection push buttons operated by a customer. Assuming therefore that the volume pulse proportioner 8 is set to transmit X out of every 100 pulses, on the assumption that the balancer counter maintains a zero count, X percent of fuel supplied would at the end of a delivery have been transmitted via the meter connected to the link 1 and 100 minus X per cent would have been transmitted via the meter connected to the link 2. Any deviation from a zero count by balancer counter 10 produces an output which gives rise to a pneumatic analogue signal which is fed back to the pump via conduit 14 to effect adjustment of the blend valve 15 to restore the delivered mixture to the set percentage of each type of petrol by tending to reduce the magnitude of the positive or negative count of the counter 10 to zero. The overall effect therefore is that the percentage of the fuel delivered which flows via the meter coupled to the connection 1 is X percent, the same as the X pulses per 100 setting for the volume pulse proportioner 8.

Figure 2:
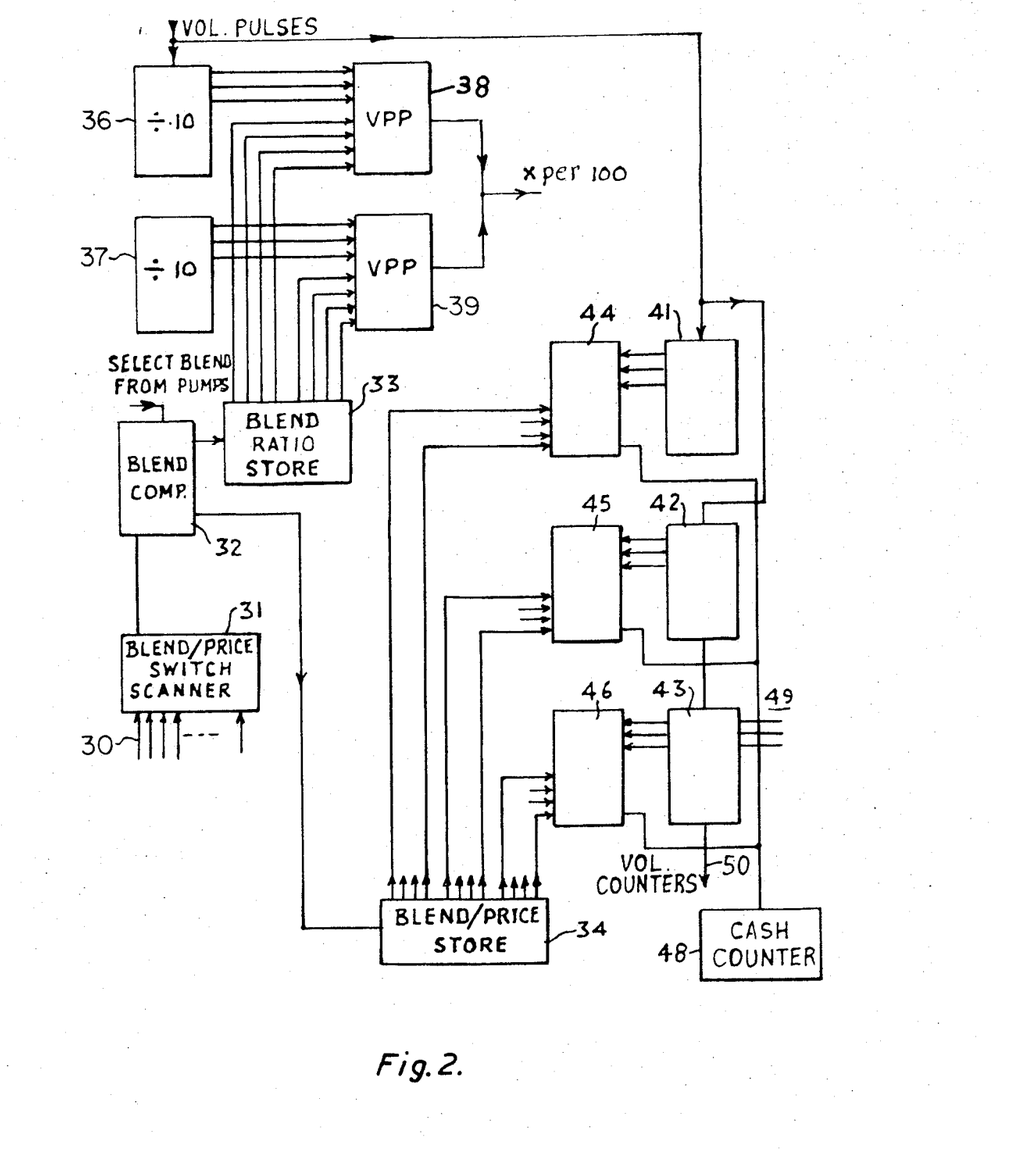
FIG. 2 illustrates in outline part of the system of FIG. 1.

The general manner in which the volume pulse proportioners operate will be more clearly appreciated by referring to FIG. 2 which shows in block form part of the equipment at the operator's location remote from the pumps. The equipment includes a blend and price switch scanner represented in FIG. 2 by the block 31. This has inputs in the drawing represented by single line inputs 30 from blend number and price switch units not shown but which are presettable by the filling station proprietor. These are digital switch units having two decimal digits for blend number and three decimal digits for price. There is for the station one such switch unit for each blend which can be made available to the customer by the system and the price and precise blend governed by each blend number is resettable manually from time to time as required. Each such digital switch has an associated unit to produce four-bit binary outputs. The blend setting of each switch therefore gives rise to two four-bit codes and the price setting produces three four-bit binary codes and as will be explained in greater detail hereafter, these can be gated in desired sequences for use.

The scanner 31 scans the group of switch units, unit by unit and when a pump blend number selection button is operated by a customer a corresponding signal is transmitted electrically to the operator's panel unit and as the corresponding blend number is scanned and re-organised by comparator 32, corresponding coded outputs are transferred to a blend ratio store 33 and blend price store 34. These stores and blend number comparator are particular to the pump being operated and are included in the remote operator's electronic display panel unit for that pump. The same is also true for other pumps. From this it will be understood that in contrast the scanner 32 serves all pump unit electronic display units of the station and enables a common set of blend and price switch units to be employed as referred to above.

The blend ratio store 33 and blend price store 34 therefore provide two four-bit binary codes and three four-bit binary codes respectively, representing blend and price per gallon of the selected blend.

Output pulses corresponding to total volume delivered from a given pump and which occur at 100 pulses per gallon, as derived from the pulse summing circuit 7 (FIG. 1) appear at the input to a decade counter 36 which therefore produces one output pulse as input to a further decade counter 37 for every 10 pulses received. The decade counters are electronic counters of a binary decimal nature such that the state of each is derivable on three binary output lines. These output lines of 36 are applied to a volume pulse proportioner logic unit 38 and these output lines for 37 are connected to a similar unit 39.

The logic units 38 and 39 are static logic circuit units which operate in accordance with the four-bit stored input thereto to select a number of conditions of the three-bit inputs from 36 or 37 respectively so that the total output pulses from 38 and 39 per 100 input pulses at 35 is X and corresponds to the required X percent as referred to above with reference to FIG. 1.

Figure 3A:
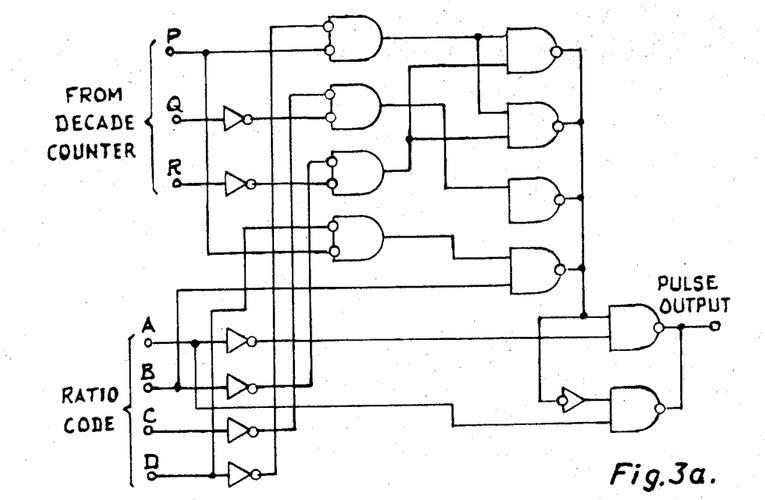
Figure 3B:
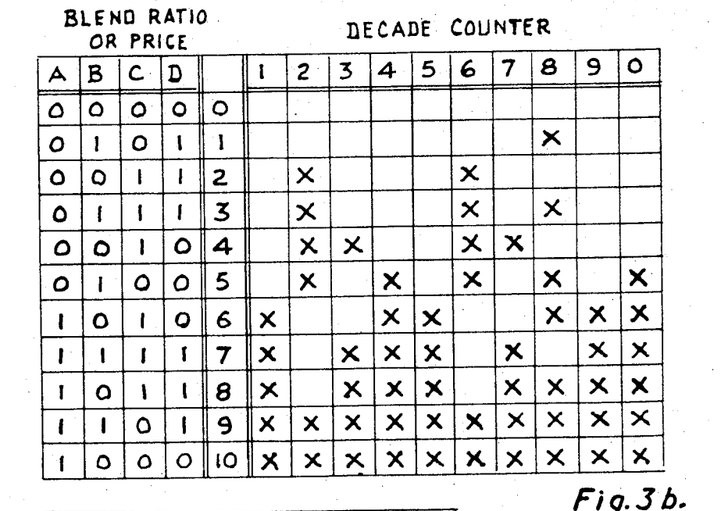
Figure 3C:
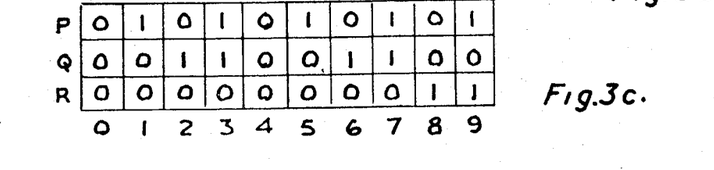

Suitable static logic and a truth table pertaining thereto are shown in FIG. 3 and will re referred to following consideration of the other volume pulse proportioning means 19 of FIG. 1.

The means 19 is also outlined in FIG. 2 and consists of three decade counter units 41, 42 and 43. It will be recalled now that the input pulses occur at a rate of 100 per gallon of fuel delivered and since the cash pricing is required to be capable of an accuracy involving cash equivalents of thousandths of a gallon or at least one tenth of a new penny in new English decimal currency, the unit 41 is constructed as a unit which by including its own pulse generator can produce in effect ten pulses for every one received. Additionally, the unit 41 then operates to provide a three-bit output binary code to an associated logic unit 45 a further four-bit code input to which is received from the blend price store 34. Similarly, decade counter unit 42 which receives the volume pulses from 35 and unit 43 which received output pulses from 42 (one per ten at the input of 42) have logic units 45 and 46.

Logic units 44, 45 and 46 are connected to receive binary decimal four-bit static coded inputs from the blend-price store 34 referred to previously. These inputs represent price per gallon of the blend selected in new decimal currency price, the codes to 44, 45 and 46 being representative of price of tens, units and tenths of a unit. The latter logic units operate to select in accordance with the binary decimal coded inputs thereto from stores 34 those states of the binary decimal counters 41, 42 and 43 for which output pulses are to be produced to an output line 47 connected to a cash counter so that the number of pulses produced to a cash counter 48 is representative of the cash to be paid for the quantity of fuel delivered.

The cash counter 48 comprises a chain of four decimal counters not shown producing outputs in binary decimal form representative of new half pence, pence, tens of pence and pounds respectively. These outputs are applied to decoder units for decoding for display on the digital display unit represented by block 20 in FIG. 1.

The counter 43 referred to above serves a further function in that it provides binary decimal outputs at 49 connected to a tenths volume decoder, and the pulse output at 50 is connected to two further cascaded counters not shown for providing units and tens volume binary codes respectively. The three binary coded outputs thus derived are decoded, as for the cash display, for display on the volume display represented by block 21 in FIG. 1.

It will be appreciated that the display units 20 and 21 referred to above are display units on the respective pump module at the operator's location. Additionally, the decoded outputs from the seven decoders mentioned above are transmitted via line wires to the corresponding customer volume and cash displays on the pumps to give immediate indication to the customer of the volume and cash total during a fuelling operation.

It will be recalled moreover that at the end of a delivery operation by a customer, on replacement of the pump nozzle, there is printed out by a printer not shown, a ticket including the volume and cash totals incurred. This is effected by a single printer for all the pumps. The printer is also provided with a continuously operating electronic scanner which scans the pump modules one by one and on arrival at a module which has reached the end of a customer operation the information stored by the module is printed out on the ticket. In this way only a single printer is required and there is no interference between the pump modules because scanning taking place in strict rotation.

The scanning is, as will be more readily seen hereafter, achieved by suitable highway gates cyclicly operable to transmit serially the binary codes representing the volume values and cash values displayed. These codes are suitable for serial operation of the printer and in addition to these are the codes representing such other data as is to be included on the printed tickets.

The operation of the volume pulse proportioners referred to above has hitherto been logically assumed but for the sake of explanation reference may now be made to FIG. 3 which at (a) shows a logic circuit using conventional symbols for one of the blocks 38, 39, 44, 45 or 46 of FIG. 2 and at (b) shows the truth table therefor. The digits shown horizontally at the top of the table represent a decade counter condition (presented as a bit code) and those set out vertically represent the blend-ratio or blend-price setting as the case may be. The four bit codes corresponding to the latter are also shown to the right of the table under bit positions A, B, C or D and correspond to the inputs to the logic circuit of FIG. 3a. The positions marked "X" indicate the decimal counter states which give rise to a pulse output.

The inputs to the logic unit, for a single decade, corresponding to the blend ratio or blend price are shown as A, B, C or D to correspond with the truth table and the inputs P, Q, R correspond to the binary decimal counter output conditions. These conditions are shown in the table of FIG. 3 c for the decimal numbers 0 to 9.

Figure 4A:
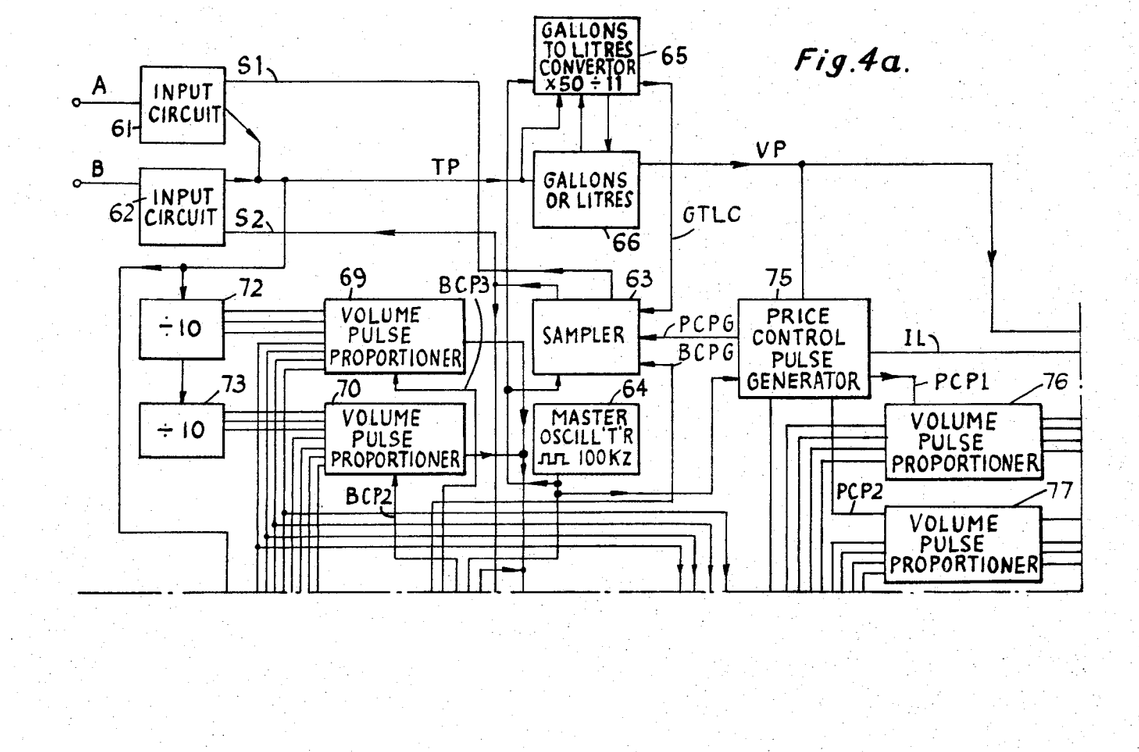
Figure 4B:
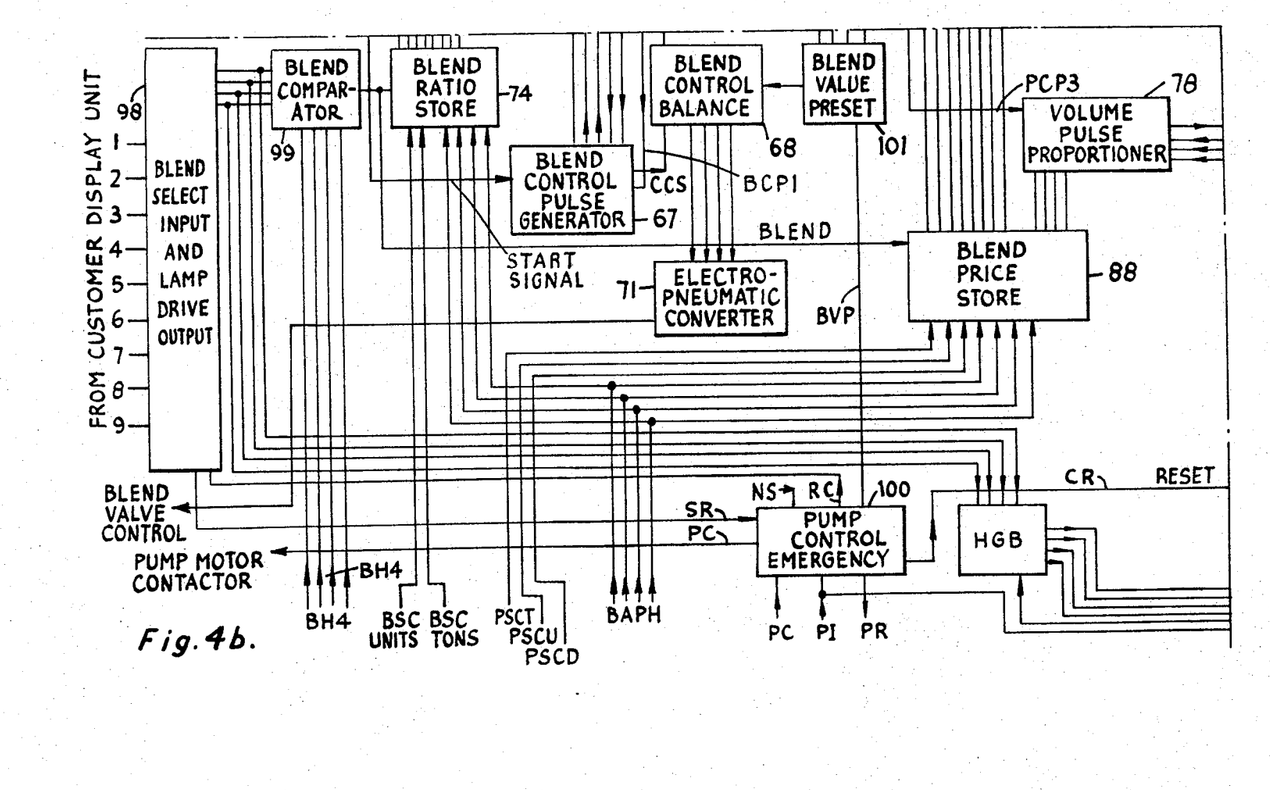
Figure 4C:
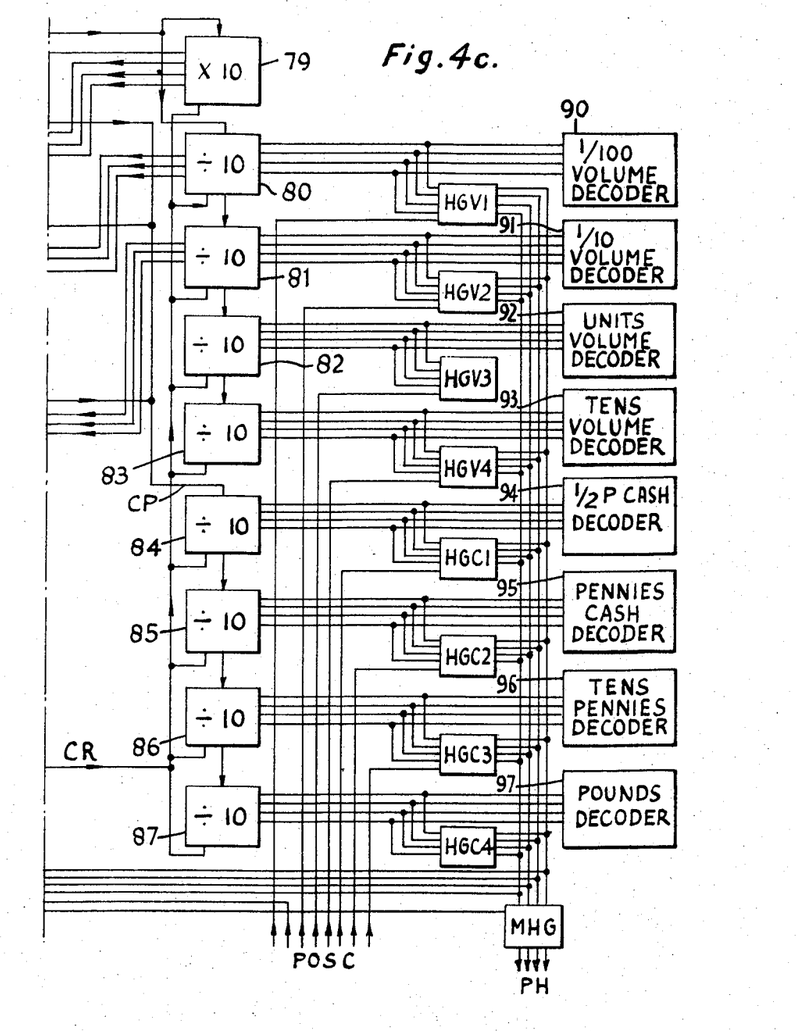

The system according to the present specific example of the invention now having been described in more or less general terms, it will be possible to appreciate the more detailed construction and operation of a module pertaining to one service pump of the apparatus. The module is shown in FIGS. 4a, 4b and 4c which when placed together represent such a pump unit module. It will be appreciated moreover that one such module for each service pump is required.

The pulse generators 3 and 4 which are driven by the flow meter shafts 1 and 2 of FIG. 1 consist of reed switches in fire proof encapsulations and the magnetic fields which operate the switches are intermittently interrupted by vanes driven by the shafts. Hence the reed switches operate intermittently by interrupting circuits through them to generate the 100 pulse per gallon flow pulses. Clearly other suitable forms of pulse generator may be employed if required and it will be appreciated that these pulses are communicated (over suitable conductors) to the respective pump module.

In the more detailed arrangement of the pump unit module of FIGS. 4a, 4b and 4c, trains of pulses corresponding to the flow of the two products appear at terminals A and B each train is applied to a pulse input circuit, these being shown as blocks 61 and 62. Each input circuit consists of two electronic storage transistor flip-flops, the first flip-flop is switched over in response to the front end of a received pulse and the second of which is set by "sampling" pulse on sample "1" line in the presence of the first flip-flop circuit being switched over as mentioned. This resets the first flip-flop circuit and puts a 5 microsecond pulse output on the total pulse line "TP". In this way, the two input circuits can respond to coincident input pulses to present non-coincident output pulses on line TP, it being understood that the sampling circuit is arranged to sample the circuits 61 and 62 alternately at a rate which is high compared with the highest possible input pulse rate.

The sampling pulses are derived from a simple form of electronic circuit represented by the block 63 and this in turn drives its pulses from a master oscillator formed by a transistor multivibrator 64 the natural frequency of which is 100 KHz. Thus the sampling pulse rate of 63 when "searching" is 50 KHz, circuit 63 being a simple two-state toggle circuit operated by the master pulses but also including a gate which inhibits the sample pulses on lines 51 and 52 for short intervals whilst certain other functions are being performed as represented by inputs on the other input lines to 63 which will now be considered.

The first of these other input lines is labelled GTLC, and is derived from a gallons-to-litres conversion unit represented by block 65. This circuit comprises an electronic counter which is responsive to each pulse on the line TP to gafe out 50 master pulses from unit 64 and a divider which divides this pulse product by 11 to produce output pulses, each such output pulse representing one hundredth of a litre. Whilst these pulses are being produced, and inhibit input is therefore present on lines TPLC to inhibit sampling. Block 66 which has inputs and outputs to 65 is merely a switch device such as an electronic switch which is set to predetermine whether the pulses output on line 67 represent one-hundredths of a litre or one-hundredths of a gallon.

A second of the above mentioned other input lines to the sampler unit 63 is labelled BCPG and is derived from a so-called blend control pulse generator represented by block 67. This block consists of an electronic toggle which when actuated places the signal on line BCPG the toggle being followed by a three stage counter the output of the last stage of which resets the toggle. The object of this unit is to condition the balancer counter (denoted previously generally by the reference 10 in FIG. 1) denoted by block 68 to count up or down if a pulse is present representing a quantity of the two products or representing the low octane product respectively. As will be seen, the volume pulse proportioners for blend control are represented by blocks 69 and 70 and pulses are transmitted by these when in conditions as explained above with reference to FIG. 3. These proportioners have to be pulsed in turn for this purpose and the necessary pulses come from the blend control pulse generator 67, applying master pulses on lines BCP2 and BCP3 in the second and third states of the above mentioned three stage counter. The first stage of the counter produces an output on BCP1 which is commoned with outputs from 69 and 70 and is effective by virtue of the counter input converter control signal CCS to decrement the counter 68. The counter 68 has a binary four-bit coded output which when applied to the electro-pneumatic converter 71 which can be of any suitable form, produces a fluid pressure output analogue signal for adjusting the blending valve.

The volume pulse proportioners 69 and 70, are as described above with reference to FIG. 2, have associated with them a cascaded pair of decimal binary output coded counters 72 and 73 which feed a binary input to the respective proportioners 69 and 70. Counter 72 receives pulses representing total product delivered the pulses coming from the line TP and in accordance with the blend ratio stored in the blend ratio store 74, so a proportion of the pulses is applied to the balancer counter, as described above, to maintain the desired dispensed blend of the two products. The actual manner in which the blend ratio code is derived and stored will be considered later herein. It will be appreciated however that whilst the blend control pulse generator 67 is effecting its sequence of output signals as described above, the sampler 63 is required to be inhibited from searching the incoming pulses at input circuits 61 and 62. Such undesired searching is thus inhibited by the signal on line BCPG produced by the toggle in block 67.

From the foregoing the manner will now be fully appreciated as to how the balancer counter 68 is arranged to be responsive to pulses appearing at inputs A and B to accrue a representation of commutative departure from desired proportions of the dispensed blend of the two products in a given dispensing operation. The blending valve is thus adjusted via signal converter 71 to correct for such a departure.

In addition to the blend control pulse generator it is necessary to provide a price control pulse generator. This is represented by the block 75. This operates in response to a volume pulse on the volume pulse line VP to initiate a sequence of output pulses on the price control pulse lines PCP1, PCP2, PCP3 for strobing the three volume pulse proportioners for price purposes and which are denoted by references 76, 77 and 78 respectively. The price control pulse generator 75 therefore consists of a further toggle preceding a three-stage electronic counter circuit which is stepped by successive master pulses after an initiating volume pulse at VP to produce the above sequence of pulses at PCP1, PCP2 and PCP3. Generator 75 also includes an inhibit gate which briefly prevents it operating at the point when the inhibit line IL has a signal on it. As will be seen, this prevents operation during transition periods of the proportioners 76, 77 and 78. Clearly, it is necessary to assume further that the sampler circuit 63 is prevented from searching whilst a price control pulse cycle is occurring and the toggle in 75 prevents this by producing a signal on line PCPG and resetting in response to the final stage of the three stage counter resetting.

Returning now to the volume pulse proportioners 76, 77 and 78, these receive blend-price four-bit binary codes from the blend price store which is represented by block 88. This is a conventional form of electronic storage device. Further, proportioners 76, 77 and 78 receive respective binary desired codes from the first three of the volume pulse decade units represented by blocks 79, 80, 81, 82 and 83. Since the proportioners are of the form described above with reference to FIG. 3, when pulsed at PCP1, PCP2 or PCP3 as the case may be with certain input conditions, they give rise to cash pulses on the line CP. These cash pulses each represent tenths of a new penny in English decimal currency and are applied to the first of the cascaded cash pulse counters 84, 85, 86 and 87.

The four-bit binary decimal codes of these decade counters 80 to 87 inclusive are connected to respective binary to decimal decoders 90 to 97. Decoders 90 to 93 operate to decode to one-hundredth, one-tenths, units and tens (of gallons or litres as desired) and decoders 94 to 97 operate to decode to half pennies (by rounding down to the nearest half penny), pennies, tens of pennies, and pounds. Outputs from the decoders consist of selective energisation of output wires to operate volume and cash display indicators not shown which take the form of any suitable commercially available digital indicators giving an illuminated display.

In order to achieve operation of the pulse proportioners it will be recalled that coded blend ratio representations are required to be stored in store 74 and coded blend price representations are required to be stored in the stores 88. It will also be remembered that these representations for all the pump modules are derived from one central presettable blend and blend price switch store in accordance with the blend number selected at the pump module in question. Block reference 98 represents the inputs derived from the customers display and control panel at the service pump. This presents on a four-bit binary coded data highway a binary code representative of the blend number of the selected blend out of blends one to nine. This four-bit coded blend number is presented by 98 as shown to the blend comparator represented by block 99 and this code persists for the duration of a dispensing operation by the module. As mentioned earlier with reference to FIG. 2, a scanner is provided which is common to all the pump unit control modules and is operable to scan in turn the blend numbers of the blend and price switch. This scanner comprises an electronic counter matrix which operates to present blend number codes (four-bit codes) to the blend number highway BNH and each such code is arranged to persist whilst the blend and price highway BAPH receives five parallel four-bit binary codes. The first two of these represent the decimal digits of a blend ratio and the third, fourth and fifth represent the decimal digits of a price per gallon (or price per litre) figure. These are derived via the scanner from the blend price switch mentioned above. In addition, the scanner produces blend ratio store strobe signals and blend price store strobe signals in order to condition the blend ratio store 74 and the blend price store 88 to at the appropriate instants accept and store the blend digits and the price digits pertaining to the selected blend number as recognised by the comparator 99. No difficulty will be experienced by the skilled person in constructing such a counter matrix as is required for this purpose employing commercially readily available integrated circuits.

It will now be appreciated that the scanner, which is part of the common control module to which all the pump unit modules of an installation are connected, scans the blend numbers built into the apparatus, presenting such numbers in code form on highway BMH and whilst each such coded number is present, the sequence of blend ratio and price code is presented on highway BAPH and a sequence of appropriate strobe signals are presented on lines BSCV, BSCT, PSCD, PSCV, PSCT. A recognised comparison in a pump module comparator such as 99 gives rise to a "THIS BLEND" signal output on line TB to condition the blend and price stores 74 and 88 to respond and set up the requisite binary digital output codes referred to above and applied to the pulse proportioners 69, 70, 76, 77 and 78 of the pump module in question.

In addition to the purely automatic functioning of the pump module in conjunction with blend number selection, codes derived from the common control module and the imput volume pulses at inputs A and B, each pump module is furnished with suitable manual operator controls. Whilst since the operation of indication lights flashing or otherwise, is of trivial nature to the skilled person, as indeed is conventional control switching, it is desirable to indicate only generally by block reference 100, the operator's panel and relevant signals connected thereto.

The control panel unit firstly receives a service request signal on line SR in response to the operation of a blend selection button at the pump itself. Secondly, the control panel unit receives a signal on the line NS indicating that the service nozzle of the pump is in its replaced position. The panel further receives inputs on lines PC (print complete)PI (print interrogate) and these will be discussed further. The panel unit 100 itself provides output signals the first PC of which operates the respective pump motor contactor, the second RC is a reset and cancel signal to the customers display at the pump. A counter reset signal line CR is also provided connected as shown to all the decode units 79, 80, 81, 82, 83, 84, 85, 86 and 87. A further signal is derived from block 100 and this appears on line BVP to a blend valve preset device 101 which though not essential is provided and connected to operate in response to the tens digit of the blend ratio output of 74, to initiate an approximate setting of the blend via the balancer unit 68. This merely produces an appropriate approximate starting value of the binary code to 71, to effect the starting position of the blend valve. By so doing an approximately correct blend is ensured even at commencement of a delivery.

On a service request signal on line SR, the operation observes the flashing red indication referred to earlier and can operate a pump start button to initiate the signal on line PC. Replacement of the delivery nozzle by the customer then is indicated by the signal on line NS in response to which in the operating state of the module, the modules puts out a print request signal on the line PR.

The printer itself forms no part of the present invention being a standard commercially available printer for printing tickets in accordance with applied control signals and coded information. However, it will be understood that the printer forms part of the common control module and the necessity for the printout scanner mentioned earlier is therefore appreciated. This scanner is again a multistage counter which operates to cyclically apply interrogate signal to the pump unit modules and on receiving a print request PR from the module the printer is locked onto that module for the printout operation by the printer. All the pump modules are connected to a common printer highway PH. This is a four-bit highway and the printer scanner therefore is arranged similarly to the blend selection scanner, to gate the relevant digits in binary form to the printer highway. A main highway gate for the module is represented by block MHG. A blend number highway gate is represented by block HGB and cash and volume highway gates are represented as blocks HGV1, HGV2, HGV3, HGV4, HGC1, HGC2, HGC3 and HGC4. These blend, volume and cash highway gates are strobed in turn during the open period of the highway gate MHG. This sequential gating is effected by a simple decode counter associated with the printer producing strobe pulses on the gate lines POSC as shown.

When the printer has completed such a printing cycle, it produces a signal on line PC which, as will be recalled from the foregoing, is accompanied by the flashing green indication and the operator can operate a control button which cancels the displays by signals on reset lines CR and RC.

Whilst the foregoing description deals with a dispensing control apparatus for controlling the delivery of a controlled blend of material from two sources and by suitable volume pulse proportioning logic, providing price computation based upon set in blend price per unit volume values a more simplified form of the apparatus may be required in some applications.

A particular simplified form of the apparatus is proposed where blending of two products is not required. In this case, the pump units themselves are arranged to transmit only one train of pulses representing the total quantity delivered. The remote pump unit control modules therefore receive only one train of volume pulses and the input circuits 61 and 62 and sampler 63 as described above with reference to FIG. 4 are not required. Again, the remaining logical control circuits associated only with the blend control are to be excluded. To be retained however are the price store 88, the price control pulse generator and the associated proportioners 76, 77 and 78 together with the decode units 79 to 87, the output decoders 90 to 97 and the printout highway gates, printer and scanner. The apparatus then functions to produce output representations and printout as desired of volume of delivered product and price thereof. It may be observed however that it will not now be desirable to provide any scanning for the generation of the price codes in the stores such as 88. These can be individually set in by use of suitable control switches. By employing pulse generators in the delivery pump units on the forecourt of a self service filling station, to generate suitable pulses to indicate the product quantity or quantities delivered together with blending control and/or volume and price pulse proportioning logic as described it is feasible and economic to employ individual pump unit modules at a control location quite remote from the pump units themselves. The minimum of mechanical parts is thereby required in these units. Further, it will also be appreciated that economic use can be made of such equipment as printers and the blend-price control switches which can be common to all the pump unit modules. By such means moreover, a compact and functionally pleasing system is afforded for filling station operators such as hitherto not been achieved.

Having thus described our invention what is claimed is:

1. Dispensing apparatus for dispensing products from separate sources, said apparatus comprising a plurality of delivery stations; a like plurality of pulse generating means, each responsive to the flow of one of the products, for generating a pulse output the number of pulses of which is proportional to the quantity of that product delivered; counter means responsive to said pulses for producing a coded output representative of the quantity of a selected product delivered at a said delivery station; digital means settable to present a price code representation of the price per unit quantity of the product; a static logic proportioning means, having a first set of input terminals for receiving said digital coded price representation and a second set of input terminals for receiving the digital coded output of said counter, for producing a pulse output related to said digital price code representation; and price code counter means for counting the number of pulses in said pulse output of said static logic proportioning means; said settable digital means comprising scanner means including a plurality of selectable inputs, and comparator means for scanning the said inputs and for transmitting a coded price output corresponding to the selected input, and said apparatus further comprising price store means individual to each delivery station for storing coded price outputs transmitted to the associated station from said comparator means.

2. Apparatus as claimed in claim 1 further comprising printer means responsive to the price pulse counter means for printing out price information for all of said delivery stations.

3. Dispensing apparatus for dispensing at least one product, said apparatus comprising pulse generating means, responsive to the flow of product, for producing a pulse output the number of pulses of which is proportional to the quantity of the product delivered; quantity counter means responsive to said pulses for producing a digital coded output representative of the quantity of the product delivered; means for producing a signal representative of a price corresponding to the quantity of the product delivered; digital means settable to present a digital price code representation of the price per unit quantity of the product; static logic proportioning means having a first set of input terminals for receiving said digital coded price representation and a second set of input terminals for receiving said digital coded output of said counter means, said proportioning means including gating means responsive to strobing pulses related to the pulse output of said pulse generating means for gating out a number of said strobing pulses, said number of gated out pulses being related to said digital price code representation; and price pulse counter means for counting the number of pulses gated out by said gating means.

4. Apparatus as claimed in claim 3 wherein said static logic proportioning means includes a plurality of static logic pulse proportioning circuits and said quantity counter means includes a plurality of decade counters for presenting a binary coded output to a respective logic pulse proportioning circuit.

5. Apparatus as claimed in claim 4 further comprising means responsive to a pulse from the said pulse generating means for causing a complete cycle of a first said decade counter so as to multiply the pulse proportion by ten.

6. Apparatus as claimed in claim 3 further comprising printer means for printing out the output from said price pulse counter means.

7. Apparatus as claimed in claim 6 further comprising scanner means for interrogating, in turn, each of a plurality of controlled dispensing means to ascertain whether a dispensing operation is completed and for, in response to the completion of a said dispensing operation, producing a control signal for initiating a printing operation by said printer means.

8. Apparatus as claimed in claim 7 wherein said printer means includes print out control means for sequentially gating binary coded decimal outputs from the quantity and/or price pulse counters to said printer means.

9. Dispensing control apparatus for controlling dispensing of a blend of desired proportions of a product from at least two sources, said apparatus comprising first pulse generator means, responsive to the flow of a product from a first source, for producing a first pulse train the number of pulses of which is proportional to the quantity of that product delivered, proportioning means for producing a further pulse train the number of pulses of which is proportional to a predetermined proportion of the total product to be delivered, said proportioning means comprising, means responsive to the flow of a product from a second source, for producing a second train of pulses the number of which is proportional to the quantity of that product delivered, means for producing a total pulse train the number of pulses of which is proportional to the sum of the pulses in said first and second pulse trains, and means responsive to said total pulse train and a desired proportion signal for producing said further pulse train; accruing means, incrementally responsive to one of said trains and decrementally responsive to the other of said trains, for producing a control output signal representative of the overall departure from the desired proportions usable in adjusting for said departure, said apparatus further comprising input circuits for receiving said first and second pulse trains, and a sampling circuit for sampling the input circuits in turn at a frequency which is high as compared with either pulse train frequency and for, when an input circuit receives an input pulse, initiating a pulse in the total pulse train.

10. Dispensing control apparatus as claimed in claim 9, wherein the proportioning means comprises coded counter means connected to receive the total pulse train and to produce a coded binary output and pulse proportioner logic circuit means connected to receive said coded output and a blend code and in response thereto to produce pulses in the further train corresponding to a proportion of the pulses in the total pulse train.

11. Dispensing control apparatus as claimed in claim 10, wherein the coded counter means includes two cascaded decode counters each connected to present a binary coded output to a respective pulse proportioner logic circuit of the said proportioning means.

12. Dispensing control apparatus as claimed in claim 9 including means responsive to a blend selection input for selecting the desired proportions of the material from the two sources.

13. Dispensing control apparatus as claimed in claim 12 wherein the blend selection input is a representation of a blend number and the apparatus further comprises a comparator operable to compare the said representation of the blend number with successive blend number representations presented thereto and on recognition of the latter representation as corresponding to the selection input, to condition storage means to store coded data pertaining to the recognised presented representation.

14. Dispensing control apparatus as claimed in claim 13, said storage means including a blend ratio code store from which the blend code to the proportioner logic circuit means is derived.

15. Dispensing control apparatus as claimed in claim 14, said storage means including a blend price code store in response to which and a quantity pulse train a price of dispensed blend may be computed.

16. Dispensing control apparatus as claimed in claim 15, further including material quantity coded counter means operable to in response to the total pulse train to produce a coded binary quantity output and further pulse price proportioner logic circuit means connected to receive said binary coded quantity output and a blend price code from the blend price code store and in response thereto to produce pulses in a price pulse train corresponding to a proportion of the pulses in the quantity pulse train.

* * * * *